Figure 1:

J. W. OWEN.
METHOD OF MAKING SOUND RECORDS AND THE MATRICES FOR MAKING SOUND RECORDS.
APPLICATION FILED MAY 4, 1908.

964,686.

Patented July 19, 1910.

2 SHEETS—SHEET 1.

WITNESSES

INVENTOR
James W. Owen.

BY

ATTORNEY

UNITED STATES PATENT OFFICE.

JAMES W. OWEN, OF PHILADELPHIA, PENNSYLVANIA, ASSIGNOR TO VICTOR TALKING MACHINE COMPANY, A CORPORATION OF NEW JERSEY.

METHOD OF MAKING SOUND-RECORDS AND THE MATRICES FOR MAKING SOUND-RECORDS.

964,686.  Specification of Letters Patent.  Patented July 19, 1910.

Application filed May 4, 1908. Serial No. 430,657.

*To all whom it may concern:*

Be it known that I, JAMES W. OWEN, a citizen of the United States, and a resident of the city and county of Philadelphia, State of Pennsylvania, have invented certain new and useful Improvements in the Method of Making Sound-Records and the Matrices for Making Sound-Records, (Case A,) of which the following is a full, clear, and exact disclosure.

The object of my invention is to produce a commercial sound record which cannot easily be duplicated or dubbed without impairing or injuring the sound record formed thereon, or incorporating into such duplicates the marks formed on the original records.

A further object of my invention is to form upon the recorded portion of commercial sound records and into the recorded portion of the matrix, from which such records are made, identification marks, words, characters, or other distinguishing marks which it may be desirable to incorporate into the body portion of the record, in such a manner as to make it extremely difficult if not impossible, to remove such marks or words or characters without injuring or destroying the record of the sound, and a further object of my invention is to form such words, or characters or other marks in the recorded portion of the record, in such a manner as not to interfere in any manner with the reproducing qualities of the record.

Other objects of my invention will appear in the specification and claims below.

My invention relates to a process or method of producing or making sound records with marks, characters, letters, words, or other suitable marks, especially upon the recorded part or portion of the record, without interfering in any manner with the reproduction of sound from the record, and when, in the specification or claims, I use the words "recorded part or portion of the record", I mean the whole or any part of the surface of the tablet, or the matrix from which the tablet is formed, bounded by the beginning and the end of the record groove or ridge, including any portion of the tablet between the grooves or ridges, or any portion of the surface or sides, or tops, or bottoms of the grooves, or ridges forming the sound record either in the tablet or in the matrix from which such record is produced.

In the usual process of making records, a master record is first made by placing a record blank on a sound recording apparatus, and causing a record stylus to vibrate in accordance with the sounds which it is desired to record, the stylus cutting or tracing or impressing a generally spiral groove having undulations therein corresponding to sound waves in said blank. After the master record has been made, a copper shell is then usually formed by dusting the surface of the master record with a conductive material, such as graphite, and depositing copper electrolytically on this surface. After a sufficient amount of copper has been deposited the shell is stripped from the matrix and the shell will have ridges in its face corresponding to the grooves in the master record. The shell is then backed up to form a matrix, which is usually plated with nickel to preserve it. Commercial records may then be made from this matrix by impressing the matrix upon a record blank of impressible material, or by flowing a liquid which will afterward congeal over the surface of the matrix. Usually, however, the records are formed by the pressing process above referred to. My method contemplates the placing the reverse of the desired mark or marks upon the recorded portion of the matrix, to which reference has been made above.

Figure 4:
Figure 5:
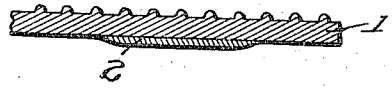
Figure 6:
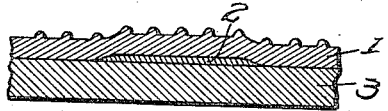
Figure 7:
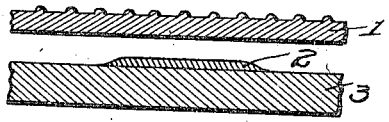
Figure 8:
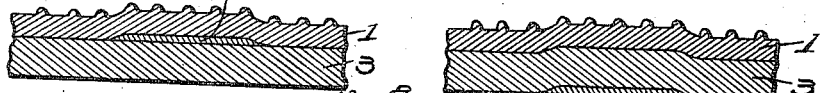
Figure 10:
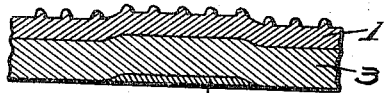
Figure 11:
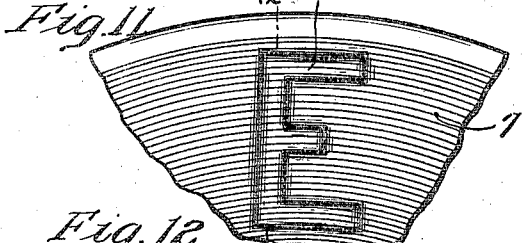
Figure 12:

In carrying out my method, I preferably first make a master record, and take a negative or shell from this master record electrolytically in the manner above indicated. I then preferably form a negative or reverse of the desired mark upon the recorded surface of the shell. This step of marking the shell may be performed in a variety of ways, a number of which are indicated diametrically in the drawings forming a part of this specification, and in which the same reference characters are used through the various views to designate the same structure. 1( Figures 1 to 3 indicate the various steps of one method of carrying out my invention; Figs. 4 to 6 indicate a modification of my invention; Figs. 7 and 8 indicate another modified manner or order of steps which may be 1( employed in carrying out my invention; and Figs. 9 and 10 a still further method or manner of carrying out my invention. Fig. 11 indicates a portion of a sound record having the marks incorporated within the recorded portion of the record in accordance with my invention; Fig. 12 indicates a section on an enlarged scale on the line 12—12 of Fig. 11, of a record marked in accordance with my invention; Fig. 13 indicates a section of a matrix having secured to the face thereof a stencil, by means of which marks may be placed upon the matrix, and Fig. 14 is a plan view of such stencil.

Referring to the drawings, 1 indicates on an enlarged scale a section of a shell formed from a master record by an electroplating or other suitable process; 2 indicates a deposit of a suitable material, in the form of distinguishing marks, letters, characters or other marks as may be desired; 3 indicates the backing to which the shell is united.

Figure 2:
Figure 3:
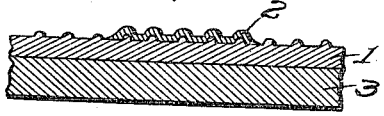
Figure 9:
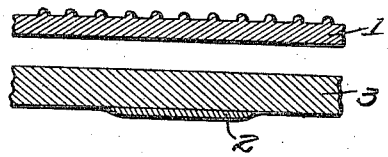

One manner of carrying out my invention is as follows: A stencil 4 having openings 5 therein corresponding to the marks which it is desired to form upon a finished record is placed over one of the faces or surfaces of the shell, and secured thereto by a thumb screw 6. The shell and stencil are then immersed in an electroplating bath, and a deposit of metal is made upon the shell through the opening 5 of the stencil. Fig. 13 illustrates the stencil as applied or as covering the recorded portion of the shell, and a thin deposit of a suitable metal, such as copper, formed upon the face of the shell and over the recorded portion thereof, as above indicated. Figs. 1 to 3 also illustrate the steps by which my method may be carried out. A portion of the recorded portion of the shell is given a thin coating of a suitable material, preferably by an electro depositing process, as above described. The shell having this deposit upon the face thereof is shown in Fig. 2. The shell is then united to the backing in any suitable manner, as by the sweating process, which consists in heating the backing 3 and flowing a solder over the surface thereof, and then soldering the shell to the backing under pressure, an elastic sheet or cushion, as for instance asbestos being placed between the recorded face of the shell and the adjacent pressing plate. The shell having the marks upon the recorded portion thereof and united to the backing is shown in Fig. 3. It is obvious, however, that in carrying out the steps the shell and the backing may be united before the mark is deposited upon the recorded portion of the shell. In Figs. 4 to 6 is outlined the similar process of forming marks upon the matrix, but in this instance the deposit is formed upon the back of the shell, as shown in Fig. 5. The shell is then united to the backing by the sweating process, that is to say soldered under pressure, and with a suitable elastic cushion over the recorded portion of the shell. This cushion is preferably made of asbestos. The shell and backing are then united under a high pressure with the result that the mark formed upon the back of the shell is pressed through the shell and appears as an elevation on the recorded portion of the shell, as plainly indicated in Fig. 6. In Figs. 7 and 8 is another modified form, but in this instance the deposit is formed first upon the face of the backing, and then when the shell is united to the backing under great pressure, the deposit between the shell and the backing appears as an elevation on the face of the shell, as clearly indicated in Fig. 8. In Figs. 9 and 10 the deposit is formed upon the back of the backing, and when the shell and backing are united under a high pressure, the deposit is pressed up into the backing through the backing, and also through the shell, and similarly appears on the face of the record.

It is, of course, desirable that the mark should not form any sharp edge upon the recorded surface of the record, otherwise there might be a noise or a click heard during the reproduction of sound as the stylus passes over the elevated or depressed portion of the record. I find that a tapering deposit, that is to say a deposit which at its edges is infinitesimal, and of increased thickness toward the middle or central part of the deposit may be formed by making the stencil slightly dished, or concave on the side adjacent the record, so that the stencil does not lie in absolute contact with the recorded portion of the record. This is illustrated on a greatly exaggerated scale in Fig. 13. I also find that by making the holes 5 through the stencil flaring with the largest diameter on the side adjacent the shell, a similar result is obtained. In this way I substantially make an elevation on the face of the shell, the edges of the elevation being tapered into the surrounding surface.

With a matrix formed in any of the manners above indicated, the record formed thereon will have corresponding marks formed upon its surface, but the marks will, of course, be reversed to those formed in the matrix, that is to say if the marks be built up upon the shell or matrix they will be depressed in the commercial record. It is further obvious that the marks themselves may be relatively depressed into the surface of the matrix by exposing substantially the whole of the shell or matrix to the action of the electrolytic bath, and protecting that portion which is to form the marks in the finished matrix or record. It is obvious that the term mark or depression or elevation or interruption is a relative one in this connection.

Whenever the deposit is made between the adjacent surfaces of either the shell or the backing, and the shell is first placed upon the backing, it is obvious that certain portions of the shell are supported and certain portions of the shell are unsupported. When the shell is united to the backing under pressure as by the sweating process the unsupported portion of the shell is pressed down against the adjacent part of the surface of the backing or conversely the elevations between the shell and the backing are pressed through the shell. In both cases the marks appear as elevated or depressed portions of the face of the shell or of the surface of the ultimate matrix.

As in the ordinary methods of forming matrices the whole matrix when completed is preferably given a complete coating of some protective material such as nickel, in order to prevent any rusting or deterioration of the surface of the matrices.

From the above, it will be apparent that when the stencil is placed over the recorded surface of the shell or matrix, as illustrated in Fig. 13, and the whole is immersed in an electroplating bath, a thin deposit of metal will be formed on that portion of the surface of the shell or matrix which is exposed through the openings in the stencil, but the deposit will be infinitesimal in thickness around the edges of the deposit and will gradually build up or increase in thickness toward the central portion of the deposit. This deposit will form an interruption in the surface of the shell or matrix, but the continuity of the surface will not be broken or interrupted and the height of the record of the sound forming the recorded surface, that is to say, the height of the sound ridge or the depth of the sound groove will be substantially constant or unchanged. I, therefore, form by the above process, an elevation on the recorded surface of the matrix or shell, but the height or depth of the record of the sound will remain unchanged, and the surface will gradually rise from the adjacent surface and sink again into it. It will also be apparent that when I make the deposit directly upon the face of the shell and when I make a deposit upon one of the adjacent surfaces of the shell and backing or even upon the back of the backing and press the deposit through to the recorded surface or face of the shell, I form a substantially vertical displacement of a portion of the surface with respect to the adjacent surface with the result that marks will appear upon the recorded surface of the matrix and, consequently, in the recorded surface of the commercial record pressed therefrom. It will also be understood that the drawings forming a part of this specification are on a greatly exaggerated scale and in practice the thickness of the deposit is very small and the displacement of the recorded surface is correspondingly small. Inasmuch as the surface of the matrix is very smooth and the surface of the commercial sound records is also smooth and highly polished, this slight vertical displacement of a portion of the surface is very apparent to the eye and looks to be greater than it actually is. Consequently, when the elevated or depressed portion of the face of the matrix or shell or commercial record pressed therefrom is given a definite contour, such as being made in the form of a trade-mark or letters, or any other distinguishing mark, such mark appears very plainly upon the finished record, as well as upon the matrix, while the stylus traversing the record groove will ride smoothly over the elevation or depression forming the mark above described, but without the production of any sound other than that originally recorded on the matrix. The mark itself, or the elevation, or depression, itself, will not phonetically affect the stylus.

In Figs. 11 and 12 is illustrated a portion of a finished record 7 having a mark 8 depressed within the recorded surface thereof, the groove 9 within the depressed portion 8 is not interrupted and the normal recorded surface is gradually tapered into the depressed portion, this result being effected by the tapering edges of the deposit 3 on the matrix.

For the purpose of briefly defining the manner in which portions of the surface of the shell and the surface of the matrix and surface of the record formed therefrom are made and to describe the character of the marks formed thereon, I have employed the word "displacing" and "interrupting" to describe the manner in which the mark differs or varies from the surrounding portion of the surface of the shell or matrix or record, and I intend these expressions to cover the depositing or building up or depressing or elevating of certain portions of the record with respect to other portions of the surrounding surface, and the marks which I form in carrying out my invention as set forth and described in my above specification are intended to all fall within the definitions I have above given.

While I have described a method of marking records, which method is preferably carried out by an electrodeposition method, any other manner of forming, or elevating, or depressing marks or forming interruptions in the recorded surface of the record, or of the matrix, or of the shell is fully contemplated by me so long as the marks therein formed do not in any wise interfere with the reproduction of sound.

Having thus fully described my invention what I claim and desire to protect by Letters Patent of the United States is:

1. The method of making records with marks on the recorded surface thereof, which consists in forming reverses of the marks on the recorded portion of the shell containing the reverse of the record grooves, backing the shell and making an impression of the matrix thus formed on a record blank.

2. The method of making records with marks on the grooved surface thereof, which consists in making a master record, taking an impression of said record by the electrotyping process, covering the metallic shell thus formed with an insulating stencil having marks cut therein, electroplating through the stencil, backing the shell, and making an impression of the matrix thus formed upon a record blank.

3. The method of making records with marks on the grooved surface thereof which consists in making a master record, taking an impression of said record by the electrotyping process, covering the metallic shell thus formed with an insulating stencil slightly dished on its contacting surface and having marks cut therein, electroplating through the stencil, backing the shell and making an impression of the matrix thus formed upon a record blank.

4. The method of making records with marks on the grooved surface thereof, which consists in making a master record, taking an impression of said record by the electrotyping process, forming reverses of the said marks on the shell thus obtained, backing the shell and making an impression of the matrix thus formed upon a record blank.

5. The method of making records with marks on the grooved surface thereof, which consists in making a master record, taking an impression of said record by the electrotyping process, forming reverses of the said marks on the shell thus obtained, covering the record surface of said shell with a sheet of elastic material and sweating said shell upon a backing plate under pressure.

6. The method of making records with marks on the grooved surface thereof, which consists in making a master record, taking an impression of said record by the electrotyping process, forming reverses of the said marks on the shell thus obtained, covering the record surface of said shell, with a sheet of elastic material, sweating said shell upon a backing plate by pressure, and making an impression from the matrix thus formed upon a record blank.

7. The method of making records with marks on the grooved surface thereof, which consists in forming reverses of the marks on the grooved portion of the matrix containing a reverse of the record, and impressing the matrix into a record blank.

8. The method of making records with identification marks on the grooved surface thereof, which consists in forming reverses of the marks on the grooved portion of the matrix containing the reverse of the record and without substantially changing the depth of the grooves, and impressing the matrix into a record blank.

9. The method of making a record having identification marks on the grooved surface thereof, which consists in recording the sound on a record blank, making an electrotype shell therefrom, changing the relative height of portions of the recorded surface on said shell without changing the depth of the groove, and then impressing the same into a plastic record blank.

10. The method of making records with identification marks on the recorded surface thereof, which consists in forming reverses of said identification marks on the recorded portion of the matrix containing the reverse of the record, and forming a record from said matrix.

11. The method of making records with marks on the recorded surface thereof, which consists in forming reverses of the marks on the recorded portion of the shell containing the reverse of the record groove, backing the shell and making an impression of the matrix thus formed on the record blank.

12. In the method of making records with marks on the recorded surface thereof, the process which consists in producing a matrix from the master record and forming the desired marks on the recorded surface of the said matrix.

13. The method of making a sound record matrix which consists in forming an interruption of predetermined configuration in the recorded surface of a shell and uniting the shell with a backing.

14. The method of making a matrix with marks on the recorded surface thereof, which consists in forming a shell from the master record, forming interruptions of predetermined configuration on the recorded surface of said shell.

15. The method of making a matrix with marks on the recorded surface thereof, which consists in forming a shell from the master record, forming elevations corresponding to desired marks on the recorded surface of said shell and uniting said shell to a backing plate.

16. The method of making a sound record matrix, which consists in forming an interruption of predetermined configuration on the recorded surface of the matrix.

17. The method of making a sound record matrix, which consists in forming an elevation of predetermined configuration on the recorded surface of the shell, and uniting the shell to a backing.

18. The method of marking a sound record matrix, which consists in substantially perpendicularly displacing a portion of the recorded surface of said matrix relatively to the adjacent portions of said surface.

19. The method of making a sound record matrix having marks upon the recorded surface thereof, which consists in displacing substantially perpendicularly a portion of said recorded surface relatively to the adjacent portions of said recorded surface.

20. The method of forming a sound record matrix with marks distinct from the grooves or ridges upon the recorded surface thereof, which consists in displacing a portion of said recorded surface substantially perpendicularly relatively to the adjacent portions of said recorded surface without changing the relative height or depth of the record of sound thereon.

21. The method of forming a sound record matrix with marks upon the recorded surface thereof which consists in perpendicularly displacing a portion of said recorded surface with reference to the adjacent portions of said recorded surface without interrupting the continuity of said surface.

22. The method of forming identification marks upon a sound record matrix, which consists in forming an electrodeposit upon a portion of the recorded surface of said matrix.

23. The method of forming a sound record matrix, which consists in elevating a portion of the recorded surface by electrically depositing a metal thereon without changing the relative height or depth of the sound record forming said recorded surface.

24. The method of forming a sound record matrix, which consists in depositing upon the recorded surface of the matrix a thin layer of metal, the edges of said deposit being infinitesimal in thickness and increasing in thickness toward the center of said deposit without substantially changing the height of the sound record forming the recorded surface of said matrix.

25. The method of marking a sound record matrix, which consists in making a master record, forming a metal shell therefrom, covering a portion of said shell with a stencil and subjecting said shell to the action of an electroplating bath.

26. The method of marking a sound record matrix, which consists in making a master record, forming a metal reverse thereof, protecting a portion of the surface of said reverse with a non-conductor and subjecting said reverse to the action of an electroplating bath.

27. The method of marking a matrix, which consists in covering a portion of the surface of said matrix with a non-conductor of electricity and electroplating the exposed surface of said matrix.

28. The method of marking a sound record matrix, which consists in covering a portion of the recorded surface of said matrix with a non-conductor of electricity and electroplating the uncovered portions of said recorded surface.

29. The method of making records with marks on the recorded surface thereof, which consists in forming a metal reverse of the master record, covering a portion of the recorded surface of said reverse with a non-conductor of electricity, plating the uncovered portions of said reverse and forming a record from said reverse.

30. The method of marking a matrix, which consists in forming a shell by the electroplating process, covering said shell with a stencil, the openings in said stencil being undercut with relation to said record and electroplating the exposed portion of said shell.

31. The method of marking a sound record matrix, which consists in forming a shell and covering said shell with a stencil, said stencil being slightly removed from the surface of said shell adjacent the openings in said stencil and electroplating the portion of said shell exposed through said openings.

32. The method of marking a sound record matrix, which consists in forming a shell, placing a stencil over the recorded side of said shell with an opening in said stencil over a portion of the recorded surface of said shell and electroplating the exposed portion of said recorded surface.

33. The method of marking a sound record matrix, which consists in placing a stencil over said matrix with an opening in said stencil, exposing a portion of the recorded surface of said matrix and depositing a metal on said exposed surface.

In witness whereof I have hereunto set my hand this 2nd day of May A. D. 1908.

JAMES W. OWEN.

Witnesses:
ALSTON B. MOULTON,
ALEXANDER PARK.